United States Patent
Ram et al.

(10) Patent No.: US 7,130,494 B2
(45) Date of Patent: Oct. 31, 2006

(54) MAGNETICALLY ACTIVE SEMICONDUCTOR WAVEGUIDES FOR OPTOELECTRONIC INTEGRATION

(75) Inventors: Rajeev J. Ram, Boston, MA (US); Tauhid Zaman, Boston, MA (US); Xiaoyun Guo, Framingham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/748,358

(22) Filed: Dec. 30, 2003

(65) Prior Publication Data

US 2004/0223719 A1    Nov. 11, 2004

Related U.S. Application Data

(60) Provisional application No. 60/437,678, filed on Jan. 2, 2003.

(51) Int. Cl.
*G02F 1/295* (2006.01)
*H01L 21/00* (2006.01)

(52) U.S. Cl. .................. 385/6; 385/11; 385/14; 385/122; 385/129; 385/130; 385/131; 385/142; 385/144; 438/29; 438/31

(58) Field of Classification Search ........ 385/129–132, 385/6, 14, 122, 11, 142, 144; 65/386; 438/31, 438/29, 26
See application file for complete search history.

(56) References Cited

U.S. PATENT DOCUMENTS

| 4,746,182 | A | * | 5/1988 | Dammann et al. | ............. 385/6 |
|---|---|---|---|---|---|
| 5,253,264 | A | * | 10/1993 | Suzuki et al. | .................. 372/46 |
| 5,408,565 | A | * | 4/1995 | Levy et al. | .................. 385/130 |
| 5,463,705 | A | * | 10/1995 | Clauberg et al. | ............... 385/14 |
| 5,570,439 | A | * | 10/1996 | Ido et al. | ........................ 385/37 |
| 5,737,474 | A | * | 4/1998 | Aoki et al. | .................. 385/131 |
| 2004/0223719 | A1 | * | 11/2004 | Ram et al. | ................... 385/144 |

FOREIGN PATENT DOCUMENTS

| EP | 0 397 089 |   | 5/1990 |
|---|---|---|---|
| JP | 2000-021671 | * | 1/2000 |
| JP | 2000021671 |   | 1/2000 |
| JP | 2004-070012 | * | 3/2004 |
| JP | 2004070012 |   | 3/2004 |

OTHER PUBLICATIONS

"Investigations of the Faraday Effect in FeDoped InP," Stadler et al. *Eighth International Conference on Schwabisch-Gmund*, Germany, Apr. 1996.
"$Cd_{1-x}Mn_x$Te Magneto-Optical Waveguide Integrated on GaAs Substrate," Zaets et al. *Appl. Phys. Lett.* May 1997. vol. 70.
"Infrared Absorption Spectra in Bulk Fe-doped InP," Fornari et al. *Appl. Phys. Lett.* Feb. 1990. vol. 56.
"Investigations of the Faraday Effect in Fe-Doped Inp," Stadler et al. *Rome Laboratory, Photonic Device Technology Division*, Hanscom Air Force Base, MA.

* cited by examiner

*Primary Examiner*—Brian M. Healy
(74) *Attorney, Agent, or Firm*—Gauthier & Connors LLP

(57) ABSTRACT

A magneto-optical device includes a waveguide structure that has at least one cladding region and core region. The cladding region and core region comprise semiconductor alloy materials. Either the at least one cladding region or the core region is doped with ferromagnetic materials so as to increase the magneto-optical activity of the device.

10 Claims, 6 Drawing Sheets

MAGNETICALLY ACTIVE SEMICONDUCTOR WAVEGUIDES FOR OPTOELECTRONIC INTEGRATION

PRIORITY INFORMATION

This application claims priority from provisional application Ser. No. 60/437,678 filed Jan. 2, 2003, which is incorporated herein by reference in its entirety.

BACKGROUND OF THE INVENTION

The invention relates to the field of optical communication, and in particular to magnetooptical isolators having high faraday rotation that can be integrated on InP and GaAs substrates.

Optical isolators are widely used to isolate active optoelectronic components, such as lasers and optical amplifiers, from unwanted optical feedback. The isolators available today utilize bulk magneto-optical materials (crystals of yttrium iron garnet or bismuth iron garnet) and birefringent crystals (lithium niobate) or bulk optical polarizers. These bulk optical components made from non-semiconducting materials cannot be easily integrated with semiconductor lasers and optical amplifiers. There is a need in the art to have magnetically active semiconductor waveguide structures so as to enable the monolithic integration of optical isolators and circulators with semiconductor optoelectronic devices.

SUMMARY OF THE INVENTION

According to one aspect of the invention, there is provided a magneto-optical device that includes a waveguide structure having at least one cladding region and core region. The cladding region and core region comprise semiconductor alloy materials. Either the at least one cladding region or the core region is doped with ferromagnetic materials so as to increase the magneto-optical activity of the device.

According to another aspect of the invention, there is provided a method of forming a magneto-optical device. The method includes forming a waveguide structure that includes at least one cladding region and core region. The cladding region and core region comprise semiconductor alloy materials. Also, the method includes doping either the at least one cladding region or the core region with ferromagnetic materials so as to increase the magneto-optical activity of the device.

DETAILED DESCRIPTION OF THE INVENTION

The novel materials and the structures made using magnetic materials require that dopant atoms of Fe, Ni or Co or fine particles of Fe, Ni or Co are introduced into semiconductor alloys, for example, InGaAsP or InGaAlAs. The dopant atoms or particles enhance the magneto-optical activity of the semiconductor and can reduce the optical loss when compared to semiconductor alloys doped with conventional n-type or p-type dopants. By using semiconductor alloys it is possible to enhance the magneto-optical effect by adjusting the material bandgap to be closer to the photon energy than is possible with binary semiconductors. These effects combined together result in materials with large magneto-optical activity and low optical toss. This combination enables novel semiconductor waveguide devices to be fabricated.

Magnetically active semiconductor alloys can be fabricated in a range of bandgap energies and refractive indices. This property allows for the fabrication of waveguide devices that can guide a beam of light so that it is in proximity with the magnetically active semiconductor alloy for an extended length and therefore has a strong interaction with the magnetically active material. This final property of magnetically doped semiconductor alloys dramatically enhances the polarization rotation that is achievable and opens a path to fully integrated isolators and circulators.

Figure 1A:
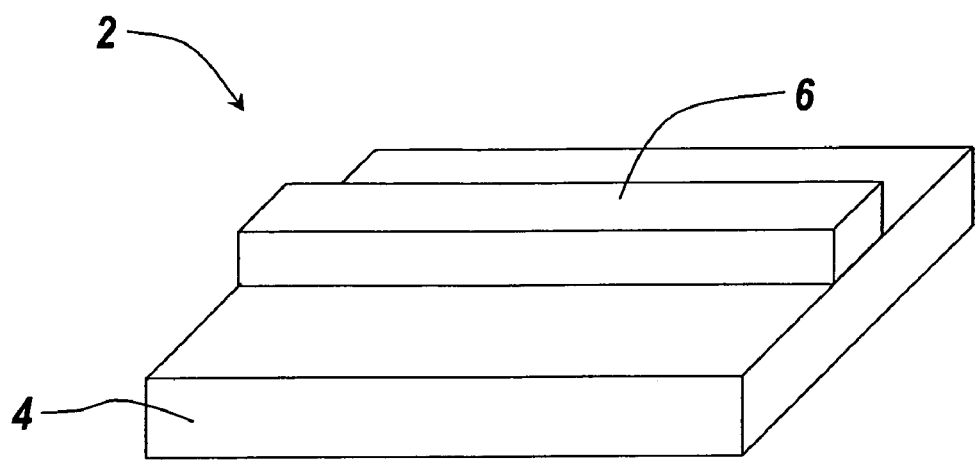
FIGS. 1A–1D are schematic block diagrams illustrating a InGaAsP waveguide formed in accordance with the invention.
Figure 1B:
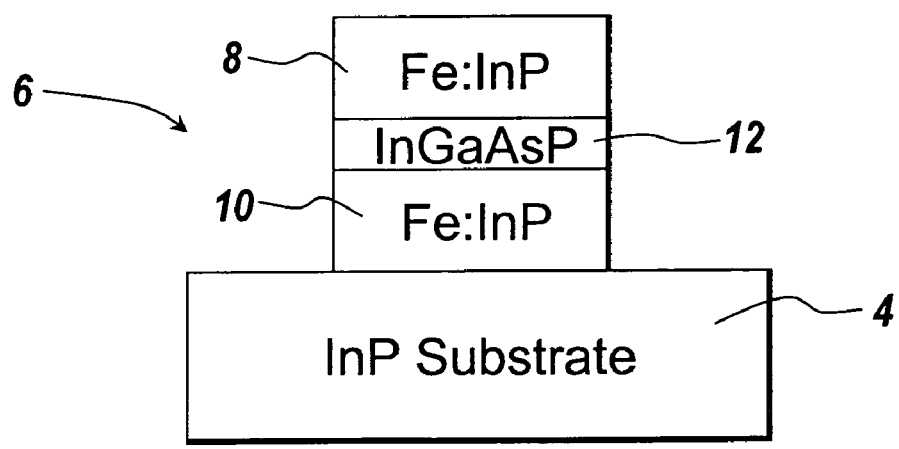
Figure 1C:
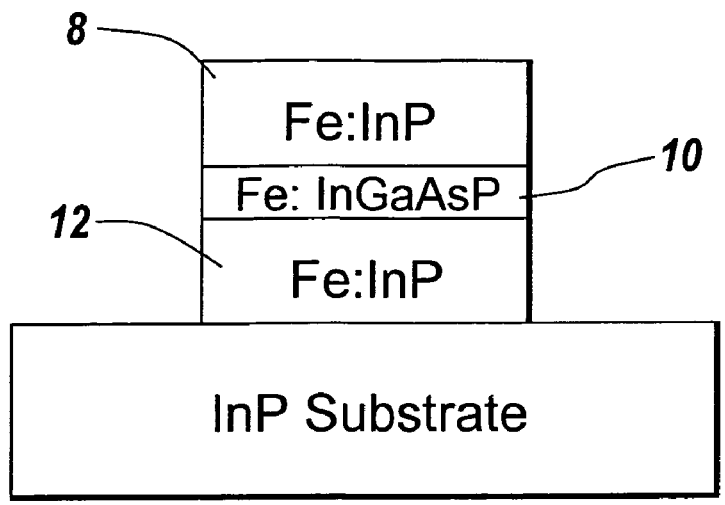
Figure 1D:
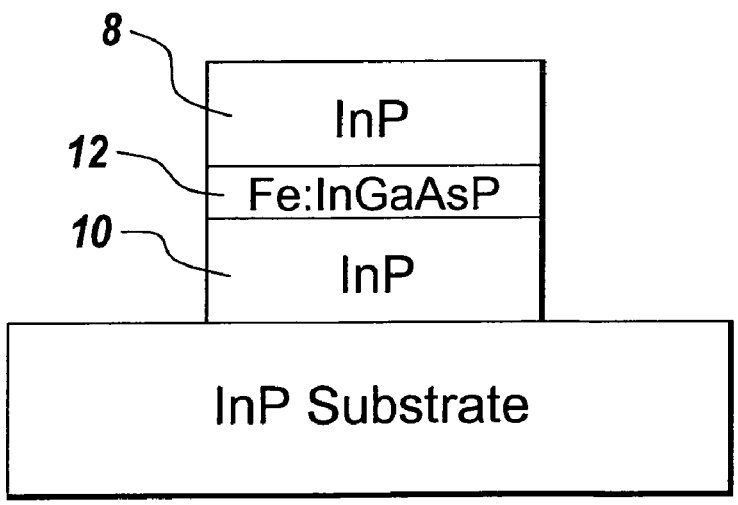

FIGS.1A–1D are schematic block diagrams illustrating a InGaAsP waveguide 2 formed in accordance with the invention. FIG. 1A shows top level view of the InGaAsP waveguide 2. The waveguide 2 includes a substrate 4 and guiding element 6. The guiding element 6 comprises two cladding regions 8, 10 and a core region 12 placed in between the cladding regions 8, 10. FIG. 1B shows a side view of the InGaAsP waveguide 2. The cladding regions 8, 10 are comprised of InP where magnetic dopants of Fe are introduced into the cladding regions 8, 10 and the core region 12 comprises InGaAsP. Note the core region 12 is not introduced with the magnetic dopants. However, FIG. 1C shows the core region 12 and cladding regions 8, 10 being exposed to magnetic dopants of Fe. FIG. 1D shows the core region 12 only being exposed to the Fe magnetic dopants. Note that the core 20 can also be comprised of InGaAlAs in other embodiments of the invention.

The Fe magnetic dopants are introduced to the core region 12 and cladding regions 8, 10 using standard doping techniques in the art. Moreover, the inventive InGaAsP waveguide 2 structure provides a necessary component to form a Faraday rotator to be used in an isolator structure, which will be described more hereinafter. Note other magnetically active semiconductor alloys can be used to form the waveguide, such as Ni, Co or fine particles of Fe.

Moreover, the magnetic dopants that are introduced are coupled to the free carriers in a semiconductor to dramatically enhance the Faraday rotation due to interband transitions. With an appropriate choice of magnetic dopant, the free carrier concentration can be reduced along with free carrier absorption. In this way it is possible to simultaneously enhance the magneto-optical activity and reduce the optical absorption of a semiconductor.

Figure 2:
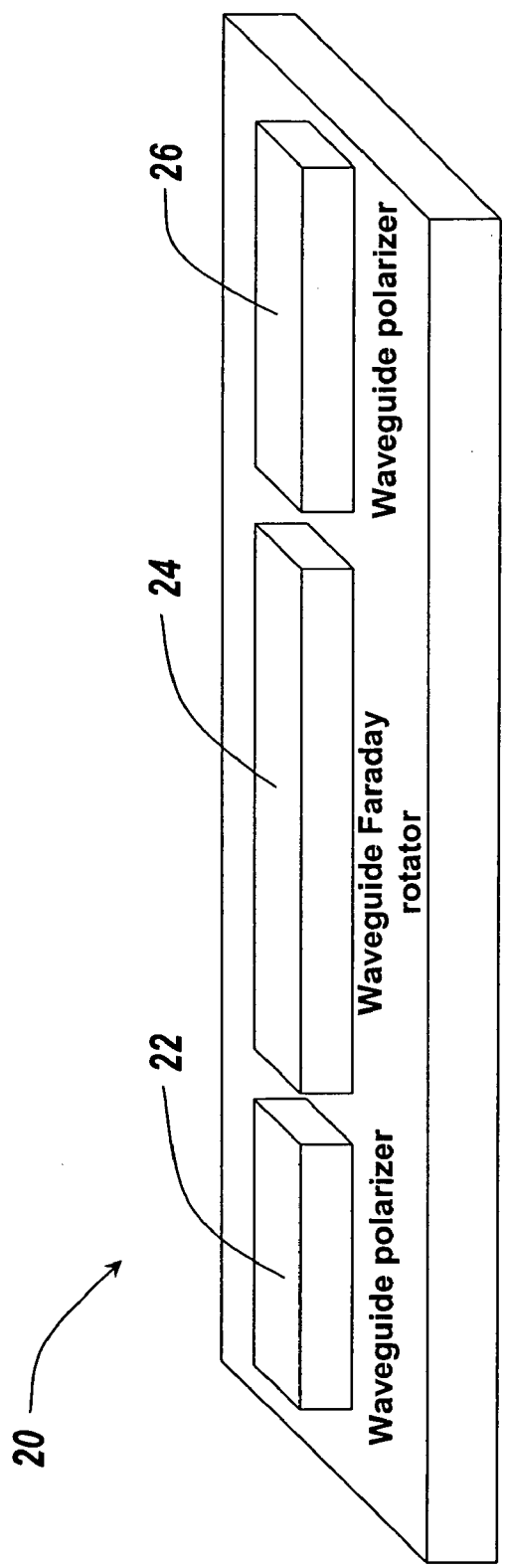
FIG. 2 is a schematic block diagram of an isolator structure formed in accordance with the invention.

FIG. 2 is a schematic block diagram of an isolator structure 20 formed in accordance with the invention. The isolator structure 20 includes an input polarizer 22, a 45 degree Faraday rotator 24, similar to that described in FIGS. 1A–1D, and an output polarizer 26. Waveguide polarizers 22, 26 can be fabricated in a wide variety of materials. The invention focuses on the development of a semiconductor Faraday rotator 24 that can be easily integrated to various optical components without undue burden. Note that this isolator structure 20 is quite similar to those in the art, however, the Faraday rotator 24 is magnetically doped in the same manner as the structure 2 describer herein.

Figure 3:
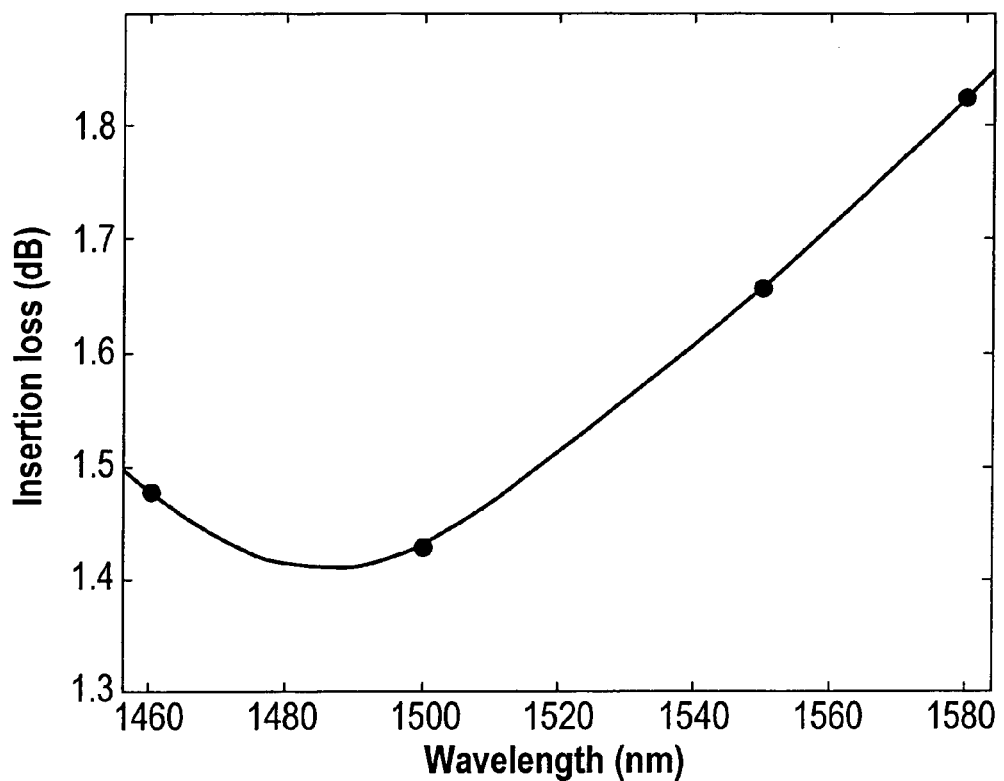
FIG. 3 is graph demonstrating optical insertion loss obtained for a 45° rotation in magnetically doped InP.

For purposes of demonstrating the efficiency of the invention, the faraday rotation of a Fe-doped InP guiding structure 6 with an Fe concentration of $2.9 \times 10^{16}$ cm$^{-3}$ is measured. At 1550 nm, the Verdet coefficient is 23.8°/cm/T and the absorption coefficient is 0.20 cm$^{-1}$. FIG. 3 shows the optical insertion loss encountered for 45 rotation through this structure; an insertion loss of less than 2 dB is maintained over the entire wavelength range. Previous measurements focused on near band edge absorption and overestimated the absorption coefficient at 1550 nm by a factor of 30 and underestimated the Verdet coefficient by a factor of 3. The loss obtained for a 45° rotation at 1550 nm at 1 T is 1.66 dB, whereas with the previous estimates it was close to 172 dB.

Figure 4:
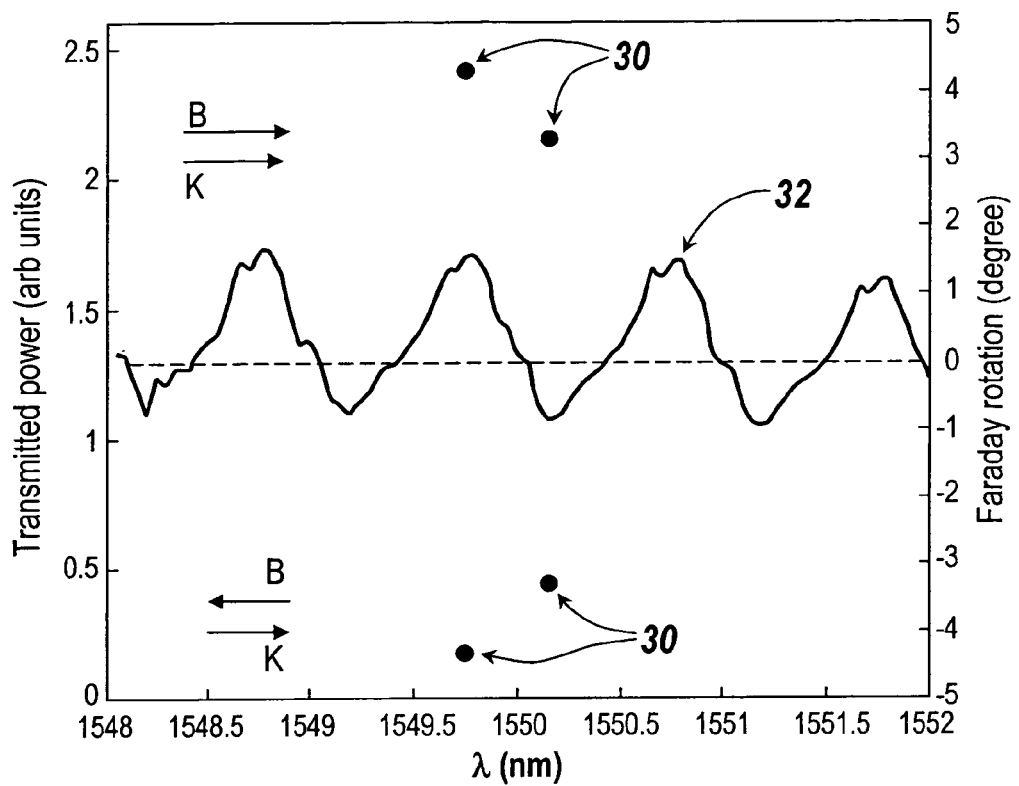
FIG. 4 is a graph demonstrating the rotation angle for linear polarization upon transmission through InP/InGaAsP/InP resonator.

Faraday rotation was measured on resonance and off resonance for a structure having a similar composition of the guiding element 6 having a 303 μm cavity length consisting of highly doped InP/InGaAsP/InP at 1 μm:0.53 μm:1.5 μcm (Fe concentration of $1 \times 10^{17}$ cm$^{-3}$) grown on a weakly doped InP substrate (Fe concentration of $1 \times 10^{16}$ cm$^{-3}$). As predicted, the resonator enhances the effective path length for rotation resulting in a 4.1° rotation on resonance and a 2° rotation off resonance. Reversal of the magnetic field confirms that the rotation is non-reciprocal, as shown in FIG. 4. FIG. 4 also shows dots 30 indicating the rotation angle for linear polarization upon transmission through InP/InGaAsP/InP resonator with a Fe concentration of $1 \times 10^{17}$ cm$^{-3}$ grown on a 300 μm InP substrate with an Fe concentration of $1 \times 10^{16}$ cm$^{-3}$. For reference, the power transmission spectrum 32 is also shown.

Realization of integrated Faraday rotators requires that magneto-optical materials be incorporated in a waveguide where TE and TM modes have nearly equal propagation constants. Here, high index contrast waveguides are designed and fabricated to achieve zero birefringence. The waveguides consist of an InGaAsP core layer and Fe-doped InP cladding layers, similar to the structure 2 described herein. To achieve appreciable Faraday rotation for the Verdet coefficients measured above, the difference of propagation constants between TE and TM modes must be less than 10$^{-5}$. The waveguide widths to realize zero birefringence are calculated using a 2D mode solver optimized for high index contrast structure.

Figure 5:
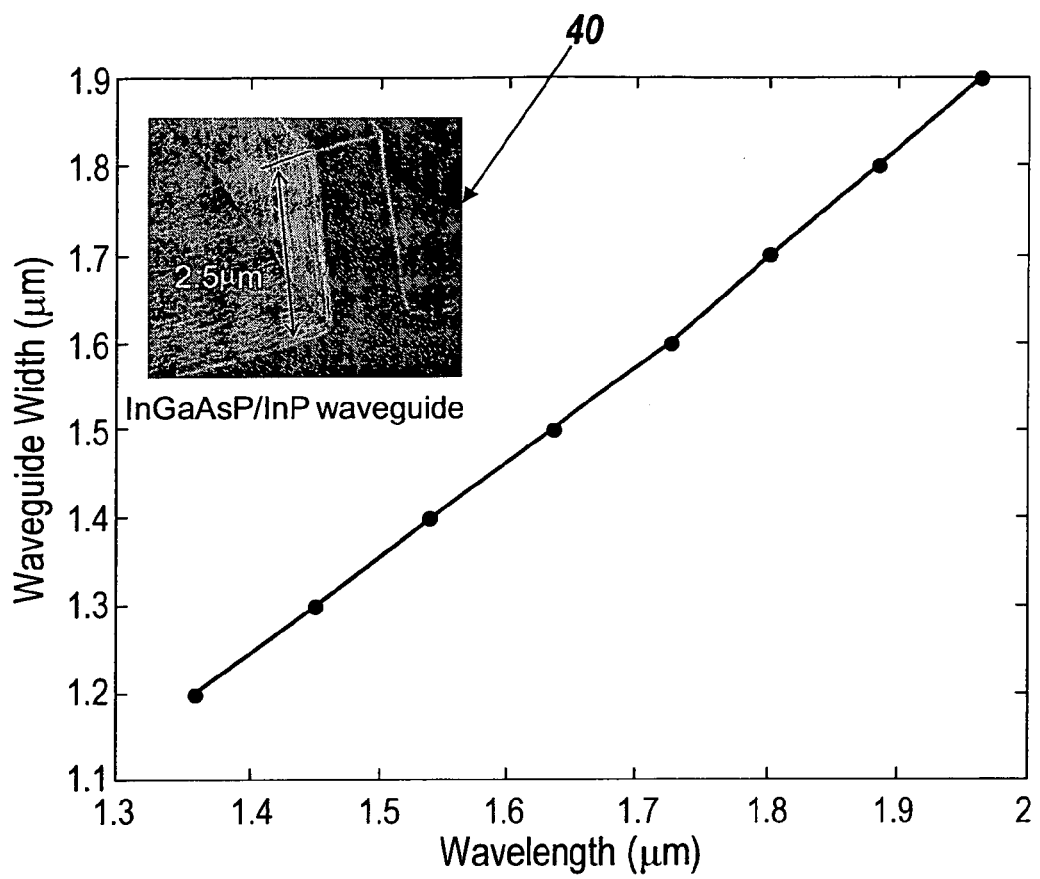
FIG. 5 is a graph illustrating waveguide width vs. wavelength to achieve zero birefringence.

The waveguide width versus wavelength for zero birefringence is shown in FIG. 5 when the etching depth is 2.5 μm. The inset 40 shows the experimental realization of this waveguide design. Preliminary measurements on magnetically doped waveguides confirm that $\Delta\beta < 10^{-3}$. Faraday rotation data for these high index contrast structures will be presented. In summary, these measurements show that InP based integrated Faraday rotators with low insertion loss can be achieved Although the present invention has been shown and described with respect to several preferred embodiments thereof, various changes, omissions and additions to the form and detail thereof, may be made therein, without departing from the spirit and scope of the invention.

What is claimed is:

1. A magneto-optical device comprising:
   a waveguide structure that includes at least two cladding regions and core region, wherein said cladding regions and core region comprise semiconductor alloy materials, either said at least two cladding regions or said core region is doped with ferromagnetic materials that are coupled to free carriers in said waveguide structure so as to increase the faraday rotation of said device.

2. The magneto-optical device of claim 1, wherein said ferromagnetic materials comprises Fe, Ni, Co or fine particles of Fe.

3. The magneto-optical device of claim 1, wherein said at least one cladding region comprises InP.

4. The magneto-optical device of claim 1, wherein said core region comprises InGaAsP.

5. The magneto-optical device of claim 1, wherein said core region comprises InGaAlAs.

6. A method of forming a magneto-optical device comprising:
   forming a waveguide structure that includes at least two cladding regions and core region, wherein said cladding regions and core region comprise semiconductor alloy materials; and
   doping either said at least two cladding regions or said core region with ferromagnetic materials that are coupled to free carriers in said waveguide structure so as to increase the faraday rotation of said device.

7. The method of claim 6, wherein said ferromagnetic materials comprises Fe, Ni, Co or fine particles of Fe.

8. The method of claim 6, wherein said at least one cladding region comprises InP.

9. The method of claim 6, wherein said core region comprises InGaAsP.

10. The method of claim 6, wherein said core region comprises InGaAlAs.

* * * * *